United States Patent

Plesek et al.

[11] Patent Number: 5,540,843
[45] Date of Patent: Jul. 30, 1996

[54] METHOD FOR PREFERENTIAL RETENTION OF CESIUM CATIONS AND THEIR SEPARATION FROM OTHER INORGANIC CATIONS

[76] Inventors: Jaromir Plesek, Patockova 97, 169 00 Praha 6; Stanislav Hermanek, Treboradicka 1069, 182 00 Praha 8; Pavel Selucky, Talafusova 6, 140 00 Praha 4, all of Czechoslovakia; Robert E. Williams, 35 Cypress Tree, Irvine, Calif. 92715

[21] Appl. No.: 371,698

[22] Filed: Jan. 12, 1995

[51] Int. Cl.⁶ ............................ C02F 1/28; C02F 1/42
[52] U.S. Cl. .................. 210/665; 210/666; 210/669; 210/682; 210/684; 210/688; 588/20; 976/DIG. 383
[58] Field of Search .................... 210/665, 682, 210/684, 688, 669, 666; 588/20; 423/2, 249; 976/DIG. 383

[56] References Cited

U.S. PATENT DOCUMENTS

| | | | |
|---|---|---|---|
| 4,033,868 | 7/1977 | Meischnec et al. | 210/200 |
| 4,432,893 | 2/1984 | Lee et al. | 252/631 |
| 4,654,146 | 3/1987 | Barkatt et al. | 210/670 |
| 4,659,512 | 4/1987 | Macedo et al. | 252/629 |
| 4,790,960 | 12/1988 | Heckmann et al. | 252/631 |
| 4,798,708 | 1/1989 | Ladd et al. | 210/688 |
| 4,933,078 | 6/1990 | Komadina | 210/219 |
| 5,205,966 | 4/1993 | Elmaleh | 252/626 |
| 5,366,634 | 11/1994 | Vijayan et al. | 210/638 |

FOREIGN PATENT DOCUMENTS 182913   4/1980   Czechoslovakia .

*Primary Examiner*—Cynthia L. Nessler
*Attorney, Agent, or Firm*—Thorpe North & Western

[57] ABSTRACT

A method of preferential removal of cesium cations from aqueous solutions containing other inorganic cations. Deltahaedral heteroborane anions are added to the solution to form a salt with the cesium cations which then precipitates from the solution. The remaining dissolved Cs-deltahaedral heteroborane anion salt is then quantitatively sorbed on active charcoal to remove it from the solution.

9 Claims, No Drawings

METHOD FOR PREFERENTIAL RETENTION OF CESIUM CATIONS AND THEIR SEPARATION FROM OTHER INORGANIC CATIONS

BACKGROUND OF THE INVENTION

The invention concerns a procedure of preferential retention of cesium cations and their separation from other inorganic cations.

PRESENT STATE OF TECHNOLOGY

Reprocessing of spent nuclear fuel results in generation of large amounts of strongly radioactive nuclear waste which must be safely treated. The amount of nuclear waste generated over the last fifty years is estimated at $3.7 \times 10^{19}$ Becquerel (Bq) (1000 MegaCuries [MCi]) and the total volume of this temporarily stored and ever increasing waste is in millions of cubic meters [C & E News, Jun. 21, 1993, 9–21; C & E News Jun. 15, 1994, 9–21; Nucl. Eng. Int., January 1991, 18–19].

The principal components of this waste are $^{90}$Sr and $^{137}$Cs together with a small amount of a wide spectrum of transuranides (TRU) in oxidation state $M^{3+}$ and $M^{4+}$. At present, the optimum method of stabilization of this waste consists of separation of the principal components, drying and vitrification in borosilicate or phosphate glass to obtain glass logs which are then stored in cooled underground repositories. The separation of $^{90}$Sr from $^{137}$Cs is necessary due to their different radiological properties (identical amounts of $^{90}$Sr produces 7.5 times more heat than $^{137}$Cs; $^{90}$Sr is almost exclusively a beta emitter while $^{137}$Cs emits also a considerable amount of gamma radiation).

The established methods of separating these two radionuclides have been described [C & E News, Jun. 21, 1993, 9–21; Nucl. Eng. Int., January 1991, 18–19; Sep. Sci. Technol. 1987, 22,191]. However, none of these processes is entirely satisfactory, particularly as far as the efficiency of the separation of the two radionuclides is concerned.

Another promising possibility of effecting this separation is through solvent extraction with cobaltacarborane ion $[3\text{-Co}(1,2\text{-C}_2B_9H_{11})_2]$ so called "COSAN" as the extractant. This method of separation has been described by us previously [Czech Patent Application 182 913].

It is becoming increasingly obvious that the problems of nuclear waste cannot be solved by one technology alone. It is also apparent that quantitative separation of the principal components $^{90}$Sr and $^{137}$Cs from the acidic waste would significantly simplify the handling/processing of the waste. For example, the radioactivity of residual liquid streams can be significantly reduced by removal of $^{137}$Cs. This would allow either concentration of the residual supernatant containing $^{90}$Sr and TRU for vitrification in the "mixed glass", or further separation of the radioisotopes prior to their vitrification.

It has been discovered that the complex anions of the COSAN type can be easily sorbed on active charcoal (AC) and that this can be used for saving the expensive COSAN from very dilute aqueous solutions.

SUMMARY OF THE INVENTION

The following discoveries form the basis and under pinnings of the method of the present invention:

1. Both the conjugate acid COSAN$^-$.(H$_3$O.nH$_2$O)$^+$, and any of its salts are sorbed regardless of the acidity of the solution (in the range of pH 1–14).

2. The capacity of the ordinary AC reaches value 0.7–1.0 mol COSAN/kg AC. For example, in the case of COSAN.Cs it corresponds to 29.2–32.4% "solid solution" of COSAN.Cs in (or at) AC.

3. The system COSAN/AC behaves as a pseudo-ion exchanger with capacity of 0.64–0.71 milliequivalents/g. It has the capability to bind different cations with a different strength. The Cs salt is bound most strongly, followed by the potassium and sodium salts. The conjugate acid alone is bound most weakly.

4. Salts of other deltahedral, molecules presenting the $D_h$ symmetry element, heteroborane anions (DHA), e.g. hexabromo-, hexachloro- and 8,8'-$\mu$-C$_6$H$_4$—; and derivatives of COSAN, e.g. $[3\text{-Fe-}(1,2\text{-C}_2B_9H_{11})_2]^-$ and $7,8\text{-C}_2B_9H_{12}^-$ are retained with similar efficiency. Moreover, salts of the complex dianion $[C_2B_9H_{11}.Co.C_2B_8H_{10}.Co.C_2B_9H_{11}]^{2-}$ sorbs on AC but only with the capacity of 0.137 mol/kg. The salts of dodecahaedral dianion $B_{12}H_{12}^{2-}$ do not sorb on AC at all.

The subject of this invention is a method which utilizes the preferential retention of Cs$^+$ from aqueous solutions and their separation from other inorganic anions. The method involves the addition to the waste solution of the deltahaedral heteroborane anion, the separation of the precipitate (if necessary), and the sorption of corresponding Cs complex on AC. The preferred deltahaedral heteroborane anion is cobalt carborane of the formula $[3\text{-Co-}(1,2\text{-C}_2B_9H_{11})_2]^-$ (II, further only COSAN) and/or its substituted derivatives, e.g. $[3\text{-Co-}(1,2\text{-C}_2B_9H_8Cl_3)_2]^-$ (hexachloro-COSAN, III); $[3\text{-Co-}(1,2\text{-C}_2B_9H_8Br_3)_2]^-$ (hexabromo-COSAN, IV); $[8,8'\text{-}\mu\text{-C}_6H_4\text{-}\{3\text{-Co-}(1,2\text{-C}_2B_9H_{10})_2\}]^-$ (phenylene-COSAN, V); $[3\text{-Fe-}(1,2\text{-C}_2B_9H_{11})_2]^-$ (FESAN, VI); $(1,2\text{-C}_2B_9H_{11}\text{-}3\text{-Co})_2C_2B_8H_{10}]^{2-}$ (VII); or $[7,8\text{-C}_2B_9H_{12}]^-$ (dicarbadodecahydroundecaborate, I) which is resistant to alkaline medium.

DETAILED DESCRIPTION

Activated charcoal has the capacity to sorb methylene blue (MB) or salts of cesium cation with deltahaedral heteroboranes between 0.7 and 1.0 mol/kg AC and has the preferred mesh size below 100. It contains up to 4% of ashable materials and can be prepared by a high-temperature carbonization (>400° C.) and by reforming with superheated steam and/or oxidation. These parameters are well satisfied by the commercially available types of AC such as Norit A (Aldrich), or Darco G60 (Aldrich) or most other laboratory grades of this material.

Preferentially, retained cesium ion salts with the deltahaedral heteroboranes on AC is first mechanically separated (by filtration and or centrifugation). It is also possible to filter it on the AC column where the Cs salt is retained and separated from the supernatant.

It is also possible to separate cesium ion salts with the deltahaedral heteroboranes by passing their aqueous solution through the AC column which was previously saturated with some other non-cesium ion salt with the deltahaedral heteroboranes, for example Na$^+$ or [H$_3$O.nH$_2$O]$^+$.

From the saturated system COSAN.M/AC (where M is the cation) the cation can be quantitatively eluted with a weakly polar organic solvent, such as alcohols, ethers, esters, ketones, nitriles, nitro-solvents, etc. The COSAN can be regenerated as a free acid from the eluent for further re-use. The extracted cation is transferred to the aqueous solution as the salt of a strong acid, e.g. as chloride, nitrate, sulfate, phosphate, etc.

It has been found that AC binds also other hydrophobic anions, such as tetraphenyl borate in the same molar ratio as it binds COSANs. However, this anion binds Cs$^+$ and other cations only in neutral or alkaline medium while in the acidic medium it decomposes. This considerably decreases its practical applicability.

The considerable sorptivity of the COSAN anions on AC indicates that the dominating parameter determining the strength of the binding is the hydrophobicity of the anion. The hydrophobicity decreases in the order: iodo->bromo->chloro-COSAN⁻> COSAN⁻> dipicrylaminate⁻> tetraphenyl borate⁻>> $I_3^-$> acetate⁻> picrate⁻> perchlorate⁻>> iodide⁻>> bromide⁻> chloride⁻>> fluoride⁻.

Another important property of the deltahaedral heteroboranes is their negligible Bronsted basicity which is comparable to the basicity of the anions of the strongest inorganic acids such as $Cl^-$, $ClO_4^-$, $HSO_4^-$, etc. Salts of deltahaedral heteroboranes are fully dissociated both in aqueous and nonaqueous solutions. Nevertheless, they are efficiently sorbed on AC from aqueous media. This feature distinguishes them from the comparably strong inorganic acids.

The sorption of both deltahaedral heteroboranes and MB is virtually instantaneous. The only disadvantage of powdered AC is its slow sedimentation and difficult filtration. Centrifugation, however offers a rapid and convenient separation of the solid phase from the supernatant.

The granular form of AC is not suitable for this separation because it has a high active surface area only for sorption of gases. Its capacity for M-deltahaedral heteroboranes and rarely exceeds 20–25% capacity of powdered AC and the rate of sorption is very slow (at least 24 hours at 20° C. is required to attain the equilibrium). On the other hand the granular forms of AC are relatively easy to separate by filtration or sedimentation.

The present invention offers a method for selective and quantitative removal of $Cs^+$ from aqueous solutions and their separation from other inorganic cations. This method is particularly suitable for separation of radioactive $^{137}Cs$ from other radionuclides present in the nuclear waste stream following reprocessing of spent nuclear fuels. For this reason it is important to select deltahaedral heteroboranes which are chemically inert in a broad range of pH, which are strong acids, and which are radiation stable. COSAN and its substitution derivatives posses all these attributes.

Cations $Cs^+$ are precipitated by COSAN⁻ from both alkaline and acidic medium. The solubility of COSAN.Cs is only 0.62 mM/liter. In the case of $^{137}Cs$ the resulting precipitate has activity of $6.94 \times 10^{11}$ Bq/g ($1.87 \ 10^7$ Ci/g) and the activity of the supernatant will be $4.3 \times 10^8$ Bq/liter ($1.16 \times 10^4$ Ci) which is unacceptedly high. However, all COSAN.Cs can be retained on AC so that the supernatant leaving the AC column is completely non-radioactive (with respect to $^{137}Cs$). On the other hand the radioactivity of the AC saturated with COSAN.Cs is $2.02–2.33 \times 10^{11}$ Bq/g ($5.46–6.30 \times 10^6$ Ci/g. other radionuclides present in the waste from e.g. PUREX processing (Plutonium+URanium EXtraction) do not interfere in this process.

The higher the concentration of $^{137}Cs$ in the initial material the more COSAN.Cs precipitate is formed. In Table 1 an example of a model separation of 1 g equivalent of $^{137}Cs$ is given.

TABLE 1

| CONC. $^{137}Cs$ in M $l^{-1}$ | Cs in the precipitate COSAN.Cs [%] | Supernatant volume [l] | Amount of AC needed [g] |
|---|---|---|---|
| 0.1 | 99.4 | 10 | 6.0–6.7 |
| 0.01 | 93.7 | 100 | 24.3–26.6 |
| 0.0033 | 50.0 | 798 | 500–555 |
| 0.001 | 37.5 | 1000 | 731–806 |
| 0.00062 | 0.0 | 1595 | 1000–1111 |

Conjugate acid COSAN⁻LH⁺ (where L=Lewis acid, such as $H_2O$, alcohol, etc.) can be regenerated from both the COSAN.Cs precipitate and from the organic eluent from the AC columns while $Cs^+$ is converted to an inorganic salt (Coll. Czech. Chem. Commun., 1984, 49, 2776).

In the case of isolation of $Cs^+$ from concentrated solutions (above 2M) of $HNO_3$, it is possible to use a hexachloro-COSAN derivative instead of the unsubstituted COSAN. The former is considerably more resistant to concentrated $HNO_3$ (Czech Patent 215 282 [9 Apr. 1982]). The somewhat lower solubility (0.3 mM/liter) of the hexachloro-COSAN is an added advantage.

On the other hand less expensive ion (I) $(7,8-C_2B_9H_{12}^-)$ is extremely stable in alkaline solutions and is preferable for $Cs^+$ separations from those media.

Testing of the suitability of active carbon for use in the method of the present invention:

The capacity of AC is a critical property for the maximum retention of the ion pair DHA–/Cs+ from water solutions. In water, the testing of AC for the sorption capacity is more advantageous when using the readily soluble salt DHA–/Na+ instead of the low soluble salt DHA/Cs.

A) Determination of the sorption capacity of the given AC for individual types of [DHA]– by trapping of the Na+ salt from aqueous solution at the AC layer A filtration column (i.d. 15 mm) was prepared by introducing aqueous suspension of silicagel to a height of 50 mm (enabling the filtration through the upper AC layer) followed by introducing an aqueous suspension of AC (1.00 g of NORIT A in 50 ml of water, degassed by 20 min. evacuation to 135 Pa) and passage of water accelerated by a slight overpressure of nitrogen. After finishing the draining, a 0.05N solution of the sodium salt of examined DHA (20 ml) was introduced. When the filtration finished (circa 60 min.), the column was washed twice by 10 ml of distilled water. In the filtrate, the content of the eluted anion was determined either colorimetrically with the strongly colored ions II–VII or gravimetrically in the form of the $B_{u4}N^+$ salts of colorless anions I, VIII and IX. The capacity of AC was determined from the difference (Table II).

Investigated DHA: $[7,8-C_2B_9H_{12}]^-$ (dicarbadodecahydroundecaborate, I); $[3-Co-(1,2-C_2B_9H_{11})_2]^-$ (II); $[3-Co-(1,2-C_2B_9H_8Cl_3)_2]^-$ (III); $[3-Co-(1,2-C_2B_9H_8Br_3)_2]^-$ (IV), $[8,8'-\mu-C_6H_4-\{3-Co-(1,2-C_2B_9H_{10})_2\}]^-$ (V); $[3-Fe-(1,2-C_2B_9H_{11})_2]^-$ (VI); $(1,2-C_2B_9H_{11}-3-Co)_2C_2B_8H_{10}]^{2-}$ (VII); $[B_{12}H_{12}]^{2-}$ (VIII); $Ph_4B^-$ (tetraphenyl borate, IX).

TABLE II

Sorption Capacity of AC NORIT A (Aldrich)* for Individual DHA (I–IX)

| Anion | I | II | III | IV | V | VI | VII | VIII | IX |
|---|---|---|---|---|---|---|---|---|---|
| Capacity mol/kg | 0.95 | 0.90 | 0.84 | 0.82 | 0.88 | 0.90 | 0.14 | 0.00 | 0.65 |

TABLE II-continued

| Sorption Capacity of AC NORIT A (Aldrich)* for Individual DHA (I–IX) | | | | | | | | | |
|---|---|---|---|---|---|---|---|---|---|
| Anion | I | II | III | IV | V | VI | VII | VIII | IX |

*) some no brand sorts of common laboratory AC reached the capacity up to 1.0 mol/Kg AC for II.

B) Determination of the sorption capacity of a given AC for individual types of [DHA]⁻ by trapping of the Na+ salt from aqueous solution by shaking with AC 1.0 g of AC was added to 50 ml of 0.02N aqueous solution of II/Na, the mixture was agitated for 5 min., AC was removed and washed two times with 10 ml portions of water. In the filtrate (70 ml) the concentration of sorbed II/Na+ was determined as 0.9 mmol of II/Na+ was trapped on AC, comparably to the procedure A).

C) Preparative Desorption of the Ion-pair COSAN-Cation from AC.

A saturated column from the experiment A) was washed by acetone until the solution was colorless (20 ml). In the case of the colorless anion I, 25 ml of acetone was used. In all cases, the desorption was quantitative as determined colorimetrically with the anions II–VII in acetone and gravimetrically as $Bu_4N^+$ salt with the anion I. The same result at II/Na+ was reached at the desorption using 30 ml of ethanol, 30 ml of wet diethylether, 20 ml of ethyl acetate or 10 ml of nitromethane.

D) Sorption of the anion II (COSAN) on AC: independency on the pH of the medium a) Solution of 18 ml of 0.05N conjugate acid II/H$_3$O+ was made up to 50 ml with 0.1N HCl (resulting concentration: 0.018N solution of COSAN). After the addition of 1.0 g of AC the suspension was evacuated for 20 min. to 130 Pa. Afterwards the vacuum was broken by nitrogen and AC was filtered and the concentration of II/M+ in the filtrate was determined colorimetrically as $4.2 \times 10^{-5}$ mol/l.

b) Solutions of 18 ml of 0.05N conjugate acid II/H3O+ were made up to 50 ml each with aqueous solution of NaOH to reach 0.1N, 1.0N and 4.2N (10%) NaOH concentrations, respectively. The rest of the procedure was the same as in C). The filtrate was practically colorless (the detection limit= $2 \times 10^{-6}$ mol/l).

EXAMPLE 1 OF THE METHOD OF THE PRESENT INVENTION

Solution of 1.2 ml of 1 mM of the conjugate acid II/H$_3$O+ was added to 1600 ml of aqueous solution, containing 1 mmol of the Cs+ cation. The resulting solution was poured onto column composed of the layer of 2 g of AC (NORIT A, Aldrich) and 1 cm layer of silica gel. The column was washed with 100 ml portions of water. In the combined filtrates only trace amount of Cs+ (ca 1–2 micromol) were found, i.e. more than 99% of Cs+ was retained on the AC column.

The content of the column was dried by air-suction and the adsorbate AC/II/Cs+ was washed by 10 ml of acetone and the solvent was removed by distillation in vacuo. After drying, 1 mmol of the yellow-orange salt was obtained.

EXAMPLE 2 OF THE METHOD OF THE PRESENT INVENTION

Solution of 110 ml of 0.001M solution of the conjugate acid II/H$_3$O+ was added to 100 ml of the acidic aqueous solution (pH 1), containing 0.1 mol of the Cs+ cation. The resulting yellow-orange precipitate of the salt III/Cs+ was centrifugated and washed with 100 ml of water; 99.8 mmol of III/Cs+ (99.8%) was obtained.

AC (1.50 g) was added to the above orange filtrate, a suspension was stirred for 10 min., centrifugated and the solid adsorbate AC/III/Cs+ was washed using 100 ml of water. In combined filtrates, less than 0.006 mmol of Cs+ salt was found. In total, over 99.994% of Cs+ was recovered.

The solid adsorbate AC/III/Cs+ was dried by air-suction, washed with 50 ml of acetone and the solvent was distilled off in vacuo. After drying, 0.15 mmol of the yellow-orange salt III/Cs+ was obtained. Total amount of the isolated salt III/Cs+ was 99.95%.

EXAMPLE 3 OF THE METHOD OF THE PRESENT INVENTION

Solution of 12 ml of the 1M aqueous solution of I/K+ (12 mmol) was added to 100 ml of the aqueous alkaline solution (pH 14), containing 10 mmol of the Cs+ cation. The resulting solution was poured onto column composed of the layer of 15 g of AC (NORIT A, Aldrich) and 1 cm layer of aluminum oxide for chromatography. The column was washed with 100 ml portion of water. In combined filtrates only trace amount of Cs+ (ca 1–2 micromol) was found, i.e. more than 99% of Cs+ was retained on AC.

The content of the column was dried by air-suction and the adsorbate AC/I/Cs+ was washed with 20 ml of acetone and the solvent was removed by distillation in vacuo. After drying, 9.99 mmol of the colorless salt I/Cs+ was obtained.

EXAMPLE 4 OF THE METHOD OF THE PRESENT INVENTION

AC (1.0 g) saturated with the conjugate acid II/H3O+ or the appropriate salt II/M+ was washed on a chromatographic column with 100 ml of water, the filtrates were evaporated to the volume of 10 ml and the content of II/M+ was determined colorimetrically and recalculated to the original concentration of the filtrate (see Table III).

TABLE III

| Relative Retention of Some Cations M+ in the System AC/II/M+ | | | | |
|---|---|---|---|---|
| Determined from the Amount of the Eluted Salt II/M+. | | | | |
| Salt | Conj. Acid | Na | K | Cs |
| μM/L | 45 | 18 | 11 | <2 |

EXAMPLE 5 OF THE METHOD OF THE PRESENT INVENTION

Experiment with "Labelled" COSAN.Cs

Most experiments were performed using non-radioactive cations. A demonstration of the quantitative effectiveness of the process required, however, the work with the Cs+ salts, "labelled" with Cs(137) to the activity of 300 Bq/ml.

The saturated aqueous solution of COSAN.Cs [$0.62 \times 10^{-3}$M] was "labelled" with Cs(137)Cl to the radioactivity of 300 Bq/ml. Using 0.1 g of AC, a 6 mm high column of 10 mm i.d. was prepared and used for the filtration of the above solution. The radioactivity of the effluent filtrate was measured in a conventional manner.

The "starting delay of sorption" (7% of the original value) is, probably, caused by a low height of the column and a possible flow of a part of the solution out of the mass of AC (e.g. on the wall of the column, through the channels in the mass of AC, etc.). The crucial characteristic for the column capacity is the plateau between 5 and 55% of the column capacity, which shows the quantitativeness of the Cs(137) adsorption provided that the column has a sufficient height.

It is to be understood that the above-described arrangements are only illustrative of the application of the principles of the present invention. Numerous modifications and alternative arrangements may be devised by those skilled in the art without departing from the pririt and scope of the present invention and the appended claims are intended to cover such modifications and arrangements.

What is claimed is:

1. A method of selectively removing cesium cations from aqueous solutions comprising
    (a) adding a deltahedral heteroborane anion to the solution, to create deltahedral heteroborane cesium salts,
    (b) separating the resulting precipitate from the solution, and
    (c) sorbing, on carbon, the residual deltahedral borate cesium salts dissolved in the supernatant.

2. A method according to claim 1 wherein the deltahaedral heteroborane anion used in step (a) is selected from the group consisting of cobalt carborane anion [3-Co-(1,2-$C_2B_9H_{11})_2$]– and its substitution derivatives.

3. A method according to claim 1 wherein the deltahaedral heteroborane anion used in step (a) is dicarbadodecahydroundecaborate [7,8-$C_2B_9H_{12}^-$] which is inert in alkaline medium.

4. A method as in claim 1 wherein the active carbon used in step (c) has capacity for methylene blue in the range 0.7–1.0 mol/kg of active charcoal.

5. A method as in claim 1 wherein step (c) comprises
    (d) mixing the aqueous solution with active charcoal, and
    (e) mechanically separating the cesium salts from the solution.

6. A method as in claim 5 wherein step (e) is selected from the group consisting of filtration and centrifugation.

7. A method as in claim 1 wherein step (c) comprises filtrating the solution through a column of active charcoal.

8. A method of selectively removing cesium cations from aqueous solutions comprising
    (a) adding a deltahedral heteroborane anion to the solution, to create a deltahedral heteroborane cesium salt;
    (b) separating the resulting precipitate from the solution, and
    (c) passing the solution through a column of activated carbon previously saturated with a salt of a cation and the deltahedral heteroborane anion.

9. A method as in claim 8 wherein the cation used in step (c) is selected from the group consisting of $Na^+$ and $[H_3O.H_2O]+$.

* * * * *